(12) United States Patent
Malhotra et al.

(10) Patent No.: US 11,974,164 B2
(45) Date of Patent: Apr. 30, 2024

(54) WIRELESS NETWORK SLICE OPTIMIZATION FOR USER APPLICATIONS

(71) Applicant: T-MOBILE INNOVATIONS LLC, Overland Park, KS (US)

(72) Inventors: Rajil Malhotra, Olathe, KS (US); Ramesh Kumar Golla, Ashburn, VA (US); Anuj Sharma, Broadlands, VA (US); Anil Kumar Mariyani, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/311,813

(22) Filed: May 3, 2023

(65) Prior Publication Data

US 2023/0276304 A1 Aug. 31, 2023

Related U.S. Application Data

(63) Continuation of application No. 17/743,759, filed on May 13, 2022, now Pat. No. 11,678,225, which is a continuation of application No. 17/178,766, filed on Feb. 18, 2021, now Pat. No. 11,399,310.

(51) Int. Cl.
*H04W 28/06* (2009.01)
*H04W 4/20* (2018.01)

(52) U.S. Cl.
CPC .............. *H04W 28/06* (2013.01); *H04W 4/20* (2013.01)

(58) Field of Classification Search
None
See application file for complete search history.

(56) References Cited

U.S. PATENT DOCUMENTS

| | | | |
|---|---|---|---|
| 10,575,230 | B2 | 2/2020 | Wang et al. |
| 10,609,551 | B1 | 3/2020 | Butler et al. |
| 11,638,205 | B2 * | 4/2023 | Wei ...................... H04W 76/11 370/329 |
| 2018/0288654 | A1 | 10/2018 | Shih et al. |
| 2019/0053147 | A1 | 2/2019 | Qiao et al. |
| 2019/0191330 | A1 | 6/2019 | Dao et al. |
| 2019/0268633 | A1 | 8/2019 | Jayawardene et al. |
| 2019/0320322 | A1 | 10/2019 | Jayawardene et al. |
| 2019/0364616 | A1 | 11/2019 | Mishra et al. |
| 2020/0204444 | A1 | 6/2020 | Marquardt et al. |
| 2020/0389843 | A1 | 12/2020 | Huang et al. |
| 2021/0368379 | A1 | 11/2021 | Xing et al. |

* cited by examiner

*Primary Examiner* — Suhail Khan

(57) ABSTRACT

A wireless communication device wirelessly downloads a user application, and in response, wirelessly receives signaling that indicates a wireless network slice for the user application. The wireless communication device wirelessly downloads another user application, and in response, wirelessly receives other signaling that indicates another wireless network slice for the other user application. The wireless communication device executes the user application, and in response, wirelessly transfers a request for the wireless network slice and wirelessly exchanges application data for the user application over the wireless network slice for the user application. The wireless communication device executes the other user application, and in response, wirelessly transfers another request for the other wireless network slice and wirelessly exchanges other application data for the other user application over the other wireless network slice for the other user application.

20 Claims, 11 Drawing Sheets

WIRELESS NETWORK SLICE OPTIMIZATION FOR USER APPLICATIONS

RELATED CASES

This United States Patent Application is a continuation of U.S. patent application Ser. No. 17/743,759 that was filed on May 13, 2022 and is entitled "WIRELESS NETWORK SLICE OPTIMIZATION FOR USER APPLICATIONS." U.S. patent application Ser. No. 17/743,759 is hereby incorporated by reference into this United States Patent Application. U.S. patent application Ser. No. 17/743,759 is a continuation of U.S. Pat. No. 11,399,310 that was filed on Feb. 18, 2021 and is entitled "WIRELESS NETWORK SLICE OPTIMIZATION FOR USER APPLICATIONS." U.S. Pat. No. 11,399,310 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications to support and use the wireless data services. For example, a robot may execute a machine-control application that communicates with a robot controller over a wireless communication network.

The wireless communication networks have wireless access nodes which exchange wireless signals with the wireless user devices over radio frequency bands. The wireless signals use wireless network protocols like Fifth Generation New Radio (SGNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), User Plane Functions (UPFs), Policy Control Functions (PCFs), Uniform Data Repositories (UDRs), Network Exposure Functions (NEFs), and the like.

The network elements are placed into groups called wireless network slices. For example, an AMF, SMF, and UPF may be grouped into a wireless network slice. The different wireless network slices have different performance levels for throughput, latency, error rate, mobility, cost, and the like. The wireless user devices may request specific wireless network slices from the wireless communication network. Unfortunately, some user applications will still use wireless network slices that do not have adequate performance for the application functionality. Other user applications will use wireless network slices that have far better performance and associated cost than needed for the application functionality. Moreover, the wireless communication networks do not efficiently and effectively help UEs use optimal wireless network slices for newly downloaded user applications.

TECHNICAL OVERVIEW

In some examples, a wireless communication device uses a wireless network slice for a user application and uses another a wireless network slice for another user application. The wireless communication device wirelessly downloads the user application, and in response, wirelessly receives signaling that indicates the wireless network slice for the user application. The wireless communication device wirelessly downloads the other user application, and in response, wirelessly receives other signaling that indicates the other wireless network slice for the other user application. The wireless communication device executes the user application, and in response, wirelessly transfers a request for the wireless network slice and wirelessly exchanges application data for the user application over the wireless network slice for the user application. The wireless communication device executes the other user application, and in response, wirelessly transfers another request for the other wireless network slice and wirelessly exchanges other application data for the other user application over the other wireless network slice for the other user application.

In some examples, a wireless communication device uses a wireless network slice for a user application and uses another wireless network slice for another user application. The wireless communication device comprises a radio and processing circuitry. The radio wirelessly downloads the user application, and in response, wirelessly receives signaling that indicates the wireless network slice for the user application and transfers the signaling to the processing circuitry. The radio wirelessly downloads another user application, and in response, wirelessly receives other signaling that indicates another wireless network slice for the other user application and transfers the other signaling to the processing circuitry. The processing circuitry executes the user application, and in response, generates a request for the wireless network slice and exchanges application data for the user application with the radio. The radio wirelessly transfers the request for the wireless network slice and wirelessly exchanges the application data for the user application over the wireless network slice for the user application. The processing circuitry executes the other user application, and in response, generates another request for the other wireless network slice and exchanges other application data for the other user application with the radio. The radio wirelessly transfers the other request for the other wireless network slice and wirelessly exchanges the other application data for the other user application over the other wireless network slice for the other user application.

DETAILED DESCRIPTION

Figure 1:
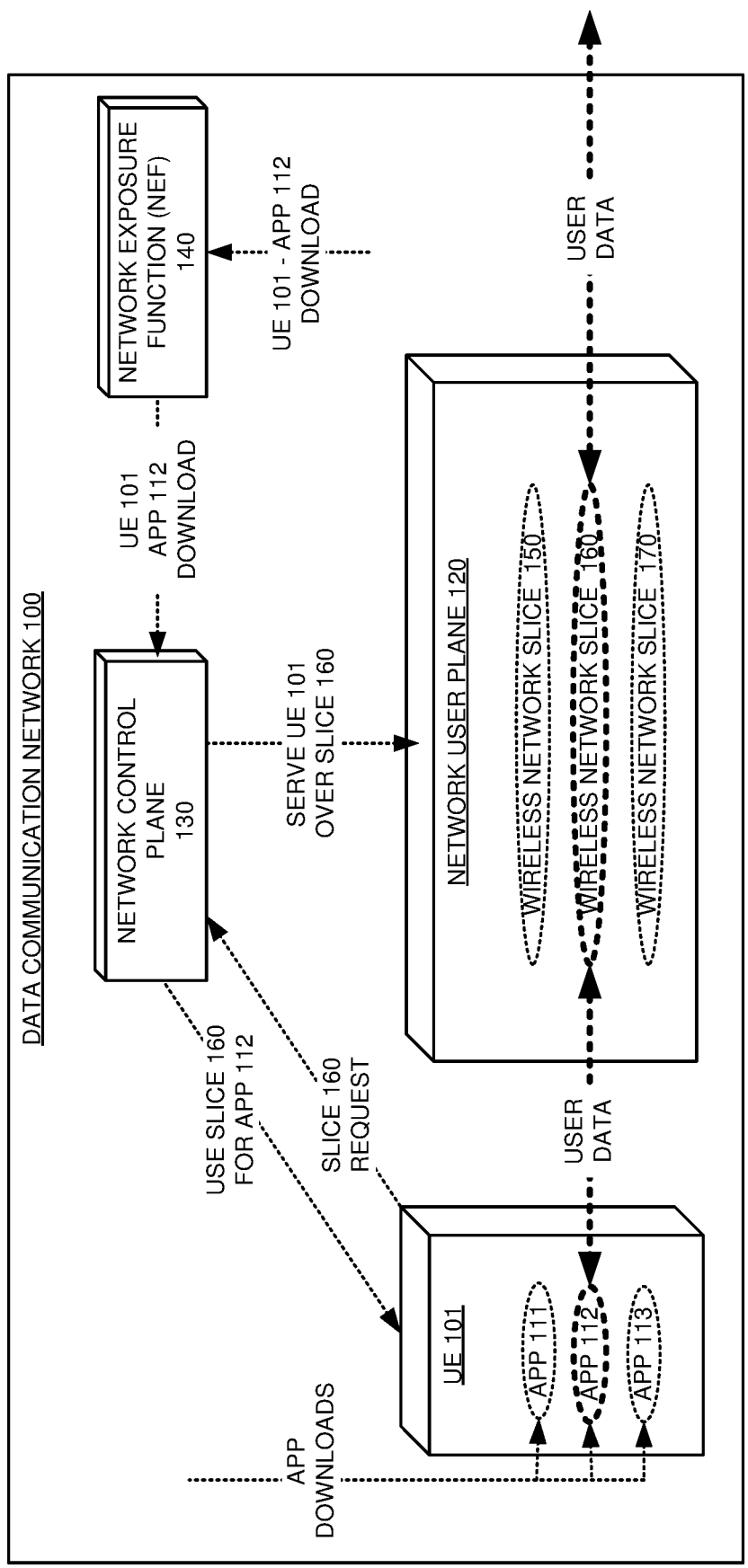
FIG. 1 illustrates a wireless communication network to use optimal wireless network slices for user applications.

FIG. 1 illustrates wireless communication network 100 to use optimal wireless network slices 121-123 for user applications 111-113. UE 101 comprises a computer, phone, vehicle, sensor, robot, or some other data appliance with wireless and/or wireline communication circuitry. Data communication network 100 delivers services to UE 101 like internet-access, machine communications, media-streaming, or some other data communications product. Data communication network 100 comprises UE 101, network user plane 120, network control plane 130, and Network Exposure Function (NEF) 140. NEF 140 is typically part of control plane 130 but is shown externally for clarity. Network user plane 120 comprises wireless network slices 150, 160, and 170. Although wireless network slices 150, 160, and 170 are shown in network user plane 120, some portions of network slices 150, 160, and 170 may reside in network user plane 130. UE 101 comprises user applications 111-113 like social networking, machine control, media-conferencing, or some other user service. The amount of UEs, user applications, and network slices has been restricted for clarity, and data communication network 100 typically includes many more UEs, applications, and slices.

Various examples of network operation and configuration are described herein. In some examples, UE 101 downloads user application 112 from a source—possibly data communication network 100. In response to the download activity, NEF 140 receives a download notice from the source that UE 101 is downloading user application 112. For example, NEF 140 may receive the download notice from an app store when the store transfers user application 112 to UE 101. In response, NEF 140 transfers a download message that indicates UE 101 and user application 112 to network control-plane 130. Network control-plane 130 receives the download message and selects wireless network slice 160 from slices 150, 160, and 170 as the optimal slice for user application 112 in UE 101. Network control-plane 130 transfers a slice message to UE 101 that indicates user application 112 and optimal wireless network slice 160. UE 101 receives the slice message and requests optimal network slice 160 from network control-plane 130 when executing user application 112. The same operation is used to immediately pair user applications 111 and 113 with their own optimal network slices 150, 160, and 170 when applications 111 and 113 are downloaded to UE 101.

Advantageously, user applications 111-113 efficiently use their optimal wireless network slices after application download to avoid poor application performance or unnecessary application cost. Moreover, data communication network 100 effectively helps UE 101 use optimal wireless network slices 150, 160, and 170 for newly downloaded user applications 111-113. In some examples, UE 101 performs a Radio Resource Control (RRC) reconfiguration with network control-plane 130 in response to the slice message to immediately request and access optimal wireless network slice 160 for user application 112. In other examples, UE 101 requests optimal wireless network slice 160 from network control-plane 130 in response to the slice message.

UE 101 communicates with network user plane 120 and network control plane 130 over technologies like Fifth Generation New Radio (5GNR), Long Term Evolution (LTE), Low-Power Wide Area Network (LP-WAN), Institute of Electrical and Electronic Engineers (IEEE) 802.11 (WIFI), IEEE 802.3 (ENET), Bluetooth, and/or some other networking protocol. Wireless communication technologies use electromagnetic frequencies in the low-band, mid-band, high-band, or some other portion of the electromagnetic spectrum. The communication links that support these technologies use metallic links, glass fibers, radio channels, or some other communication media. The communication links use ENET, Time Division Multiplex (TDM), Data Over Cable System Interface Specification (DOCSIS), Internet Protocol (IP), General Packet Radio Service Transfer Protocol (GTP), 5GNR, LTE, WIFI, Fifth Generation Core (5GC), virtual switching, inter-processor communication, bus interfaces, and/or some other data communication protocols.

UE 101, user plane 120, and control plane 130 comprise antennas, amplifiers, filters, modulation, analog/digital interfaces, microprocessors, software, memories, transceivers, bus circuitry, and the like. NEF 140 comprises microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of data communication network 100 as described herein.

Network user plane 120 may comprise: 5GNR gNodeBs, LTE eNodeBs, non-Third Generation Partnership Project Access Nodes (non-3GPP ANs), non-3GPP Interworking Functions (IWFs), 3GPP User Plane Functions (UPFs), Central Authorized Application Repositories (CAARs) and/or some other network elements that handle user data. Network control plane 130 may comprise: 5GNR gNodeBs, LTE eNodeBs, IWFs, CAARs, 3GPP Access and Mobility Management Functions (AMFs), Session Management Functions (SMFs), Policy Control Functions, (PCFs), Uniform Data Repositories (UDRs), and/or some other network elements that direct user plane 120 with network signaling. NEF 140 could be integrated into control plane 130.

Figure 2:
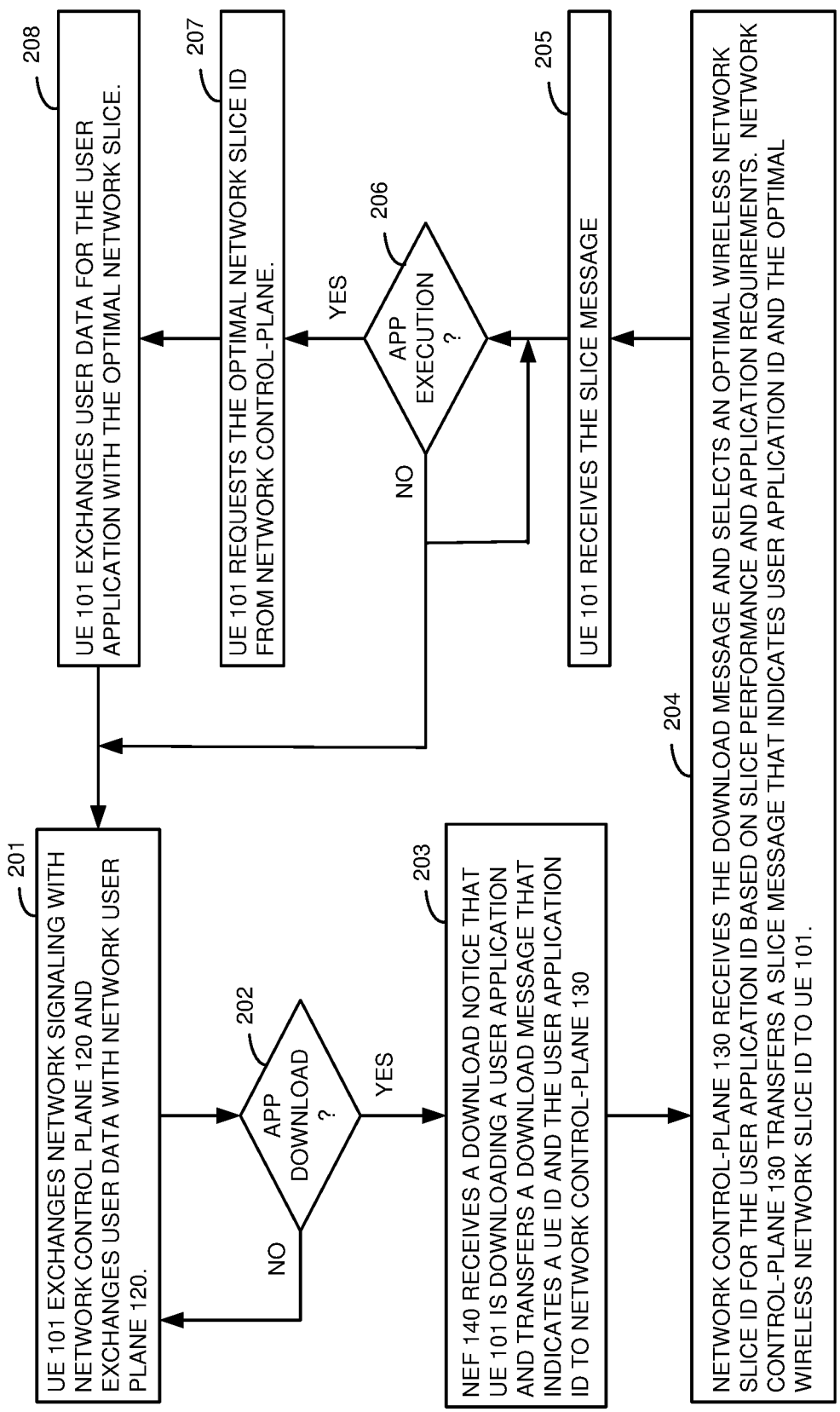
FIG. 2 illustrates an exemplary operation of the wireless communication network to use the optimal wireless network slices for the user applications.

FIG. 2 illustrates an exemplary operation of wireless communication network 100 to use optimal wireless network slices 121-123 for user applications 111-113. The operation is exemplary and may vary in other examples. UE 101 exchanges network signaling with network control plane 130 and exchanges user data with network user plane 120 (201). When UE 101 downloads a user application (202), NEF 140 receives a download notice that UE 101 is downloading the user application and transfers a download message to network control-plane 130 that indicates a UE ID for UE 101 and an application ID for the downloaded user application (203). Network control-plane 130 receives the download message and selects an optimal wireless network slice ID for the user application ID based on slice performance and application requirements (204). Network control-plane 130 transfers a slice message to UE 101 that indicates the user application ID and optimal wireless network slice ID (204). UE 101 receives the slice message (205). When UE 101 executes the user application (206), UE 101 requests the optimal network slice ID from network control-plane 130 (207). UE 101 exchanges user data for the downloaded user application with the optimal one of wireless network slices 150, 160, and 170 (208). The operation repeats (201).

Figure 3:
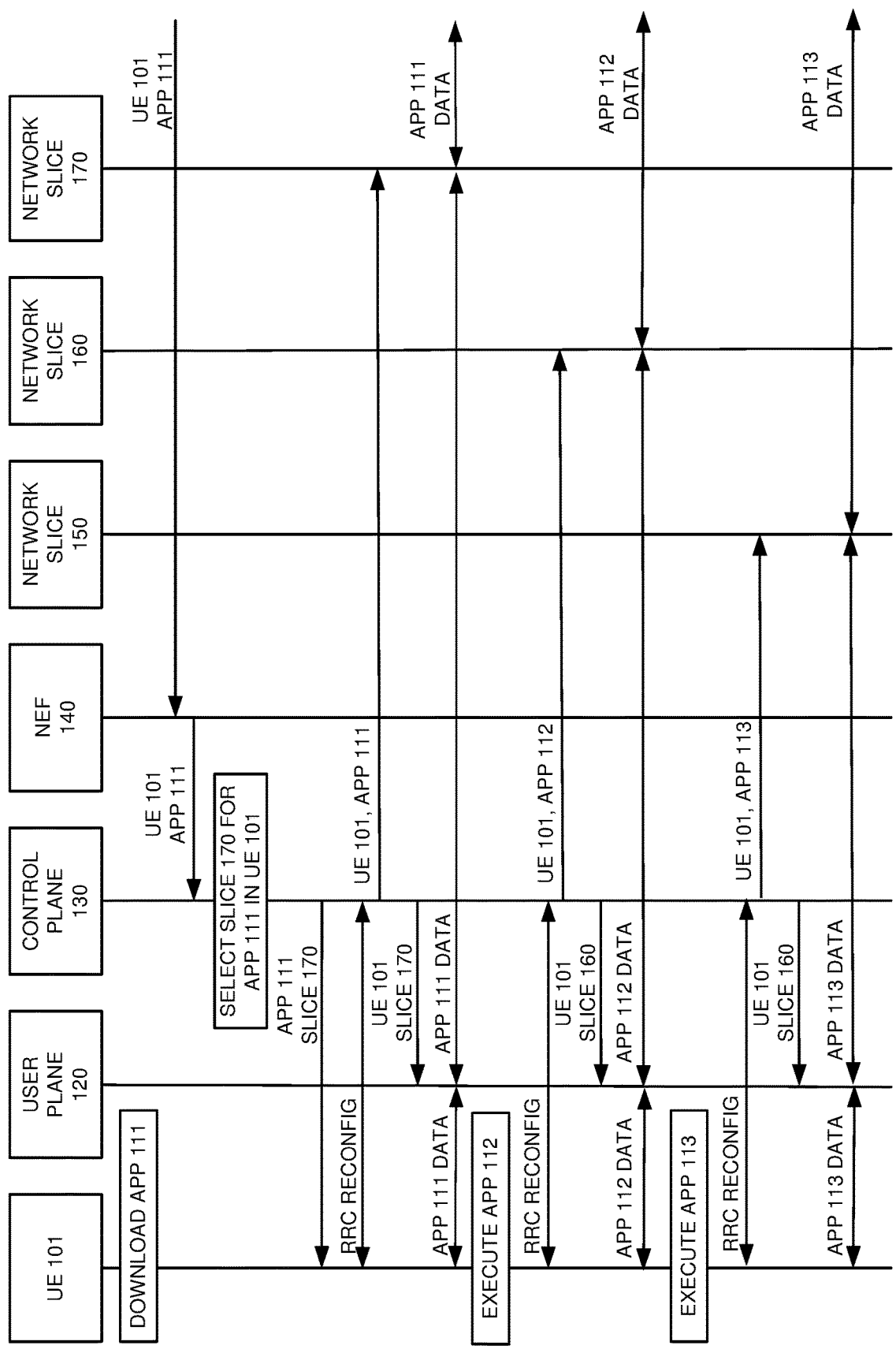
FIG. 3 illustrates an exemplary operation of the wireless communication network to use the optimal wireless network slices for the user applications.

FIG. 3 illustrates an exemplary operation of wireless communication network 100 to use optimal wireless network slices 121-123 for user applications 111-113. The operation is exemplary and may vary in other examples. UE 101 uses Radio Resource Control (RRC) reconfiguration to request optimal wireless network slices, but other techniques like N1 signaling to an SMF in control plane 130 could be used to request optimal wireless network slices. UE 101 downloads user application 111 from a source. In response to the download, NEF 140 receives a download notice from the source that UE 101 is downloading user application 111. In response to the download notice, NEF 140 transfers a download message that indicates UE 101 and user application 111 to network control-plane 130. Network control-plane 130 selects wireless network slice 170 as the optimal slice for user application 111 in UE 101. The selection typically entails comparing the requirements of user application 111 with the performance of slices 150, 160, and 170 to select the optimal slice that best meets the key application requirements. Network control-plane 130 transfers a slice message that indicates user application 111 and optimal wireless network slice 170 to UE 101.

UE 101 receives the slice message and performs a RRC reconfiguration with network control-plane 130 in response to the slice message to immediately request optimal wireless network slice 170 for user application 111. Control plane 130 transfers network signaling to user plane 120 to serve UE 101 over optimal wireless network slice 170. Control plane 130 transfers network signaling to optimal wireless network slice 170 to serve UE 101 for user application 111. UE 101 and user plane 120 exchange data for user application 111. UE 101 and user plane 120 exchange user data for user application 111. User plane 120 and optimal wireless network slice 170 exchange the user data for user application 111. Optimal wireless network slice 170 exchanges the user data for user application 113 with an external system.

In response to a prior download of user application 112, UE 101 already has a network instruction to use optimal wireless network slice 160 for user application 112. UE 101 executes user application 112, and in response to the execution of user application 112 and the network instruction, UE 101 performs an RRC reconfiguration with network control-plane 130 to request optimal wireless network slice 160 for user application 112. Control plane 130 transfers network signaling to user plane 120 to serve UE 101 over optimal wireless network slice 160. Control plane 130 transfers network signaling to optimal wireless network slice 160 to serve UE 101 for user application 112. UE 101 and user plane 120 exchange data for user application 112. UE 101 and user plane 120 exchange user data for user application 112. User plane 120 and optimal wireless network slice 160 exchange the user data for user application 112. Wireless network slice 160 exchanges the user data for user application 112 with an external system.

In response to the prior download of user application 113, UE 101 also has a network instruction to use optimal wireless network slice 150 for user application 113. UE 101 executes user application 113, and in response to the execution of user application 113 and the network instruction, UE 101 performs another RRC reconfiguration with network control-plane 130 to request optimal wireless network slice 150 for user application 113. Control plane 130 transfers network signaling to user plane 120 to serve UE 101 over optimal wireless network slice 150. Control plane 130 transfers network signaling to optimal wireless network slice 150 to serve UE 101 for user application 113. UE 101 and user plane 120 exchange user data for user application 113. User plane 120 and optimal wireless network slice 150 exchange the user data for user application 113. Wireless network slice 150 exchanges the user data for user application 113 with an external system.

Figure 4:
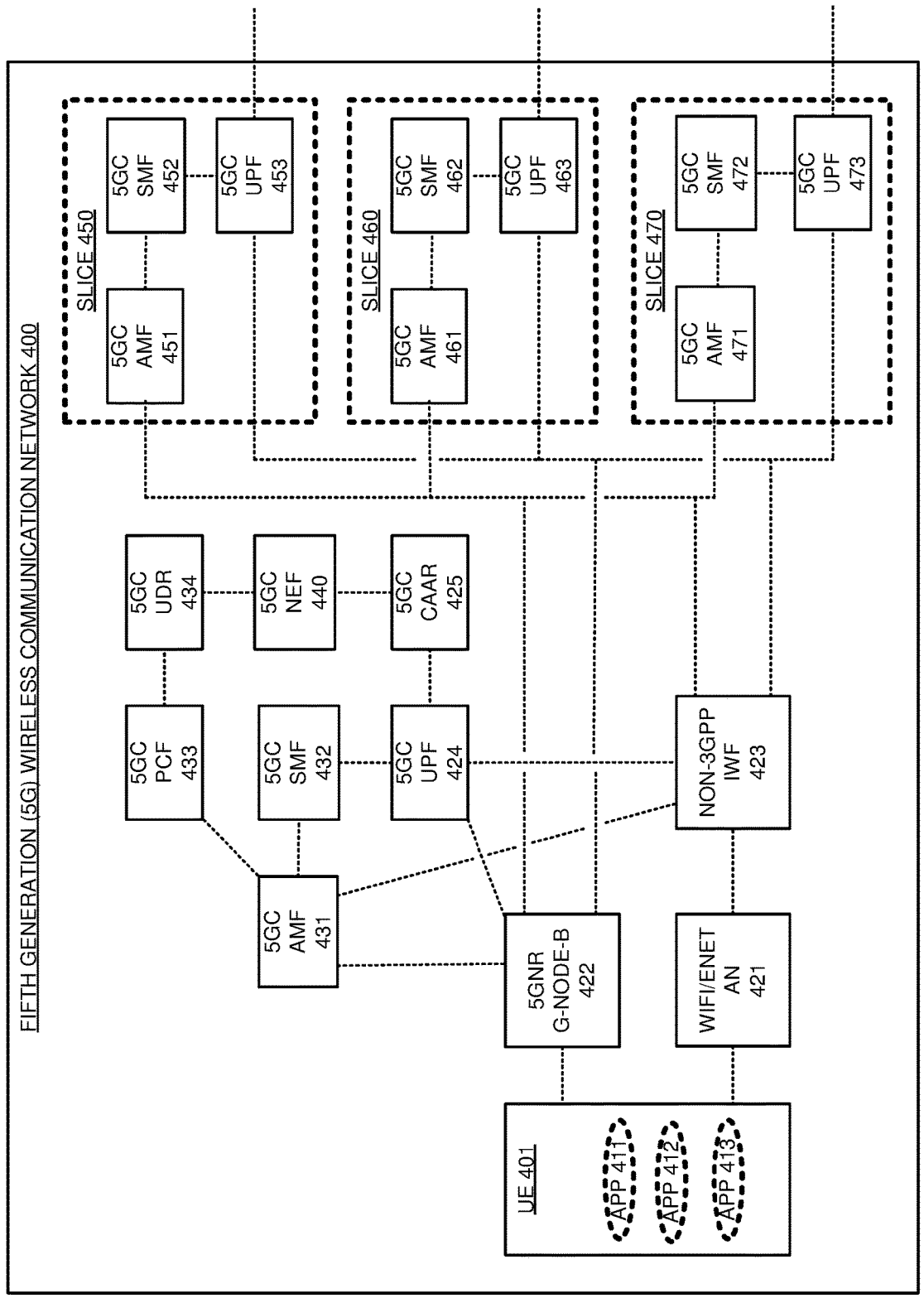
FIG. 4 illustrates a Fifth Generation (5G) wireless network that uses optimal wireless network slices for user applications.

FIG. 4 illustrates Fifth Generation (5G) wireless network 400 to use optimal wireless network slices 450, 460, and 470 for user applications 411-413. 5G communication network 400 comprises an example of data communication network 100, although network 100 may vary from this example. 5G communication network 400 comprises UE 401, IEEE 802.11/IEEE 802.3 Access Node (WIFI/ENET AN) 421, Fifth Generation New Radio (5GNR) gNodeB 422, non-3GPP Interworking Function (IWF) 423, Fifth Generation Core (5GC) User Plane Function 424, 5GC Central Authorized Application Repository (CAAR) 425, Access and Mobility Management Function (AMF) 431, 5GC Session Management Function (SMF) 432, Policy Control Function (PCF) 433, 5GC Uniform Data Repository (UDR) 434, 5GC Network Exposure Function (NEF) 440, and wireless network slices 450, 460, and 470. Wireless network slice 450 comprises AMF 451, SMF 452, and UPF 453. Wireless network slice 460 comprises AMF 461, SMF 462, and UPF 463. Wireless network slice 470 comprises AMF 471, SMF 472, and UPF 473. UE 401 comprises user applications 411-413, although initially, UE 401 has not yet downloaded user applications 411-413. A network user plane is formed by AN 421, gNodeB 422, IWF 423, UPF 424, CAAR 425, UPF 453, UPF 563, and UPF 473. A network control plane is formed by AMF 431, SMF 432, PCF 433, UDR 434, NEF 440, AMF 451, SMF 452, AMF 261, SMF 462, AMF 471, and SMF 472.

UE 401 may register with WIFI/ENET AN 421 and then register with 3GPP IWF 423. 3GPP IWF 423 selects 5GC AMF 431 for UE 401 based on UE location, requested slice, or last/current AMF. UE 401 registers with 3GPP AMF 431 to establish an N1 over WIFI/ENET AN 421 and 3GPP IWF 423.

UE 401 may register with 5GNR gNodeB 422. 5GNR gNodeB 422 selects 5GC AMF 431 for UE 401 based on UE location, requested slice, or last/current AMF. UE 401 registers with 3GPP AMF 431 and they establish an N1 over 5GNR gNodeB 422.

AMF 431 may direct SMF 432 to establish a bearer for UE 401 to CAAR 425 over non-3GPP IWF 423. SMF 432 drives UPF 424 to serve the bearer to UE 401. AMF 471 directs UE 401 to use the bearer to CAAR 425. UE 401 and CAAR 425 communicate over the bearer that traverses AN 421, IWF 423, and UPF 424 to download user applications 411-413.

AMF 431 may direct gNodeB 422 to establish a bearer for UE 401 to UPF 424. AMF 431 directs SMF 432 to extend the bearer for UE 401 from 5GNR gNodeB 422 to CAAR 425. SMF 432 drives UPF 424 to serve the bearer to UE 401. 5GNR gNodeB 422 directs UE 401 to use the bearer to CAAR 425. UE 401 and CAAR 425 communicate over the bearer that traverses 5GNR gNodeB 422 and UPF 424 to download user applications 411-413.

UE 401 downloads user application 411 from CAAR 425 over the path that traverses AN 421, IWF 423, and UPF 424, or the path that traverses gNodeB 422 and UPF 424. In response to the download, CAAR 425 transfers a download notice to NEF 440 that indicates that UE 401 has downloaded user application 411. NEF 440 transfers a corresponding download message to UDR 434 that indicates that UE 401 has downloaded user application 411.

In response to the download of user application 411, UDR 434 queries a Unified Data Management (UDM), subscriber database, or some other UE provisioning system with a UE ID for UE 401 to identify a set of available network slices for UE 401. UDR 434 also queries UDM for slice performance levels like throughput, latency, reliability, mobility, and cost. The UE ID comprises an International Mobile Subscriber Identifier (IMSI), Subscription Permanent Identifier (SUPI), Subscription Concealed Identifier (SUCI), or some other UE reference data. UDR 434 also queries UDM with an application ID for user application 411 to obtain key application requirements like throughput, latency, reliability, mobility, and cost.

UDR 434 determine the closeness of the application requirements for application 411 to the corresponding slice performance levels of slices 450, 460, and 470. UDR 434 selects the closest one of slices 450, 460, and 470 to application 411 requirements as the optimal slice. For example, UDR 434 may normalize and sum the differences in corresponding performance levels and then select the optimal slice having a score closest to zero. UDR 434 avoids costly slices that outperform the requirements of some user applications. UDR 434 also finds slices that have specific performance levels in key areas for user applications that have more challenging requirements. UDR 434 selects slice 470 for application 411 for UE 401 and transfers a UE message to PCF 433 that indicates UE 401, user application 411, and optimal wireless network slice 470.

PCF 433 may perform a UE Access Selection and Policy Information Update to configure UE 401 to use slice 470 for application 411. PCF 433 transfers a resulting policy message to AMF 431 that indicates UE 401, application 411, and slice 470. AMF 431 receives the policy message from PCF 433 and responsively transfers a slice message to UE 401 indicating application 411 and wireless network slice 470. The slice message comprises Non-Access Stratum (NAS) data that traverses an N1 link between AMF 431 and UE 401.

In this example, UE 401 uses RRC or non-3GPP reconfiguration to access optimal network slices 450, 460, and 470 that have different AMFs 451, 461, and 471 from serving AMF 431. In other examples, UE 401 could access other optimal network slices that do not have an AMF by directly requesting the slices from SMF 432 or AMF 431 over N1—and without RRC or non-3GPP reconfiguration. In response to the slice message from AMF 431 and the download of user application 411, UE 401 performs an RRC reconfiguration with SGNR gNodeB 422 or a non-3GPP reconfiguration with non-3GPP IWF 423 to request optimal wireless network slice 470. SGNR gNodeB 422 or 3GPP IWF 423 select 5GC AMF 471 for UE 401 based on requested wireless network slice 470. UE 401 registers with 3GPP AMF 471 and they establish an N1 over AN 421-IWF 423 or gNodeB 422. AMF 471 directs gNodeB 422 or IWF 423 to establish a bearer for UE 401 to UPF 473. AMF 471 directs SMF 472 to extend the bearer for UE 401 over UPF 473. SMF 472 drives UPF 473 to serve the bearer to UE 401. AMF 471 and gNodeB 422 direct UE 401 to use the bearer over optimal wireless network slice 470. User application 411 in UE 401 now communicates over optimal wireless network slice 470 using either AN 421-IWF 423 or gNodeB 422.

Subsequently UE 401 may again register with AMF 431 over AN 421-IWF 423 or gNodeB 422 to download user application 412. AMF 431 directs gNodeB 422 or IWF 423 to establish a bearer for UE 401 to UPF 424. AMF 431 directs SMF 432 to extend the bearer to CAAR 425. SMF 432 drives UPF 424 to serve the bearer to UE 401. AMF 431 and/or gNodeB 422 direct UE 401 to use the bearer to CAAR 425. UE 401 may now download user application 412 from CAAR 425 over AN 421-IWF 423-UPF 424 or over gNodeB 422-UPF 424. In either case, CAAR 425 transfers a download notice to NEF 440 that indicates that UE 401 has downloaded user application 412. NEF 440 transfers a corresponding download message to UDR 434 that indicates that UE 401 has downloaded user application 412.

UDR 434 queries to identify the set of available network slices for UE 401 and their performance levels for throughput, latency, reliability, mobility, cost, and the like. UDR 434 also queries with an application ID for user application 412 to obtain key application requirements for throughput, latency, reliability, mobility, cost, and the like. UDR 434 determines the closeness of the key application requirements for application 412 to the corresponding slice performance levels of slices 450, 460, and 470. UDR 434 selects the closest one of slices 450, 460, and 470 as the optimal slice for UE 401 and user application 412. UDR 434 selects slice 460 for UE 401 and application 412 and transfers a UE message to PCF 433 that indicates UE 401, user application 412, and optimal wireless network slice 460.

PCF 433 may perform a UE Access Selection and Policy Information Update to configure UE 401 to use slice 460 for application 412. PCF 433 transfers a resulting policy message to AMF 431 that indicates UE 401, application 412, and slice 460. AMF 431 receives the policy message from a PCF 433 and responsively transfers a slice message indicating application 412 and wireless network slice 460 to UE 401. The slice message comprises NAS data traverses one of the N1 links between AMF 431 and UE 401.

In response to the slice message from AMF 431 and the download of user application 412, UE 401 performs an RRC or non-3GPP reconfiguration with 5GNR gNodeB 422 or non-3GPP IWF 423 to request optimal wireless network slice 460. 5GNR gNodeB 422 or 3GPP IWF 423 select 5GC AMF 461 for UE 401 based on requested wireless network slice 460. UE 401 registers with 3GPP AMF 461 and they establish an N1 over AN 421-IWF 423 or gNodeB 422. AMF 461 directs SMF 462 to establish a bearer for UE 401 over gNodeB 422 or IWF 423. SMF 462 drives UPF 463 to serve the bearer to UE 401. AMF 461 and gNodeB 422 direct UE 401 to use the bearer over optimal wireless network slice 460. User application 412 in UE 401 now communicates over optimal wireless network slice 460 using either AN 421-IWF 423 or gNodeB 422.

Subsequently UE 401 may again register with AMF 431 over AN 421-IWF 423 or gNodeB 422 to download user application 413. AMF 431 directs gNodeB 422 or IWF 423 to establish a bearer for UE 401 to UPF 424. AMF 431 directs SMF 432 to extend the bearer to CAAR 425. SMF 432 drives UPF 424 to serve the bearer to UE 401. AMF 431 and/or gNodeB 422 direct UE 401 to use the bearer to CAAR 425. UE 401 may now download user application 413 from CAAR 425 over UPF 424 and AN 421-IWF 423 or gNodeB 422. In either case, CAAR 425 transfers a download notice to NEF 440 that indicates that UE 401 has downloaded user application 413. NEF 440 transfers a corresponding download message to UDR 434 that indicates that UE 401 has downloaded user application 413.

UDR 434 queries to identify the set of available network slices for UE 401 and their performance levels for throughput, latency, reliability, mobility, cost, and the like. UDR 434 queries with an application ID for user application 413 to obtain key application requirements for throughput, latency, reliability, mobility, cost, and the like. UDR 434 determine the closeness of the key application requirements for application 413 to the corresponding slice performance levels of slices 450, 460, and 470. UDR 434 selects the closest one of slices 450, 460, and 470 as the optimal slice for UE 401 and user application 413. UDR 434 selects slice 450 for UE 401 and application 413 and transfers a UE message to PCF 433 that indicates UE 401, user application 413, and optimal wireless network slice 450.

PCF 433 may perform a UE Access Selection and Policy Information Update to configure UE 401 to use slice 450 for application 413. PCF 433 transfers a resulting policy message to AMF 431 that indicates UE 401, application 413, and slice 450. AMF 431 receives the policy message from PCF 433 and responsively transfers a slice message indicating application 413 and wireless network slice 450 to UE 401. The slice message comprises NAS data traverses one of the N1 links between AMF 431 and UE 401.

In response to the slice message from AMF 431 and the download of user application 413, UE 401 performs an RRC or non-3GPP reconfiguration with SGNR gNodeB 422 or non-3GPP IWF 423 to request optimal wireless network slice 450. SGNR gNodeB 422 or 3GPP IWF 423 select 5GC AMF 451 for UE 401 based on requested wireless network slice 450. UE 401 registers with 3GPP AMF 451 and they establish an N1 over AN 421-IWF 423 or gNodeB 422. AMF 451 directs SMF 452 to establish a bearer for UE 401 over gNodeB 422 or IWF 423. SMF 452 drives UPF 453 to serve the bearer to UE 401. AMF 431 and gNodeB 422 direct UE 401 to use the bearer over optimal wireless network slice 450. User application 413 in UE 401 now communicates over optimal wireless network slice 450 using either AN 421-IWF 423 or gNodeB 422.

Figure 5:
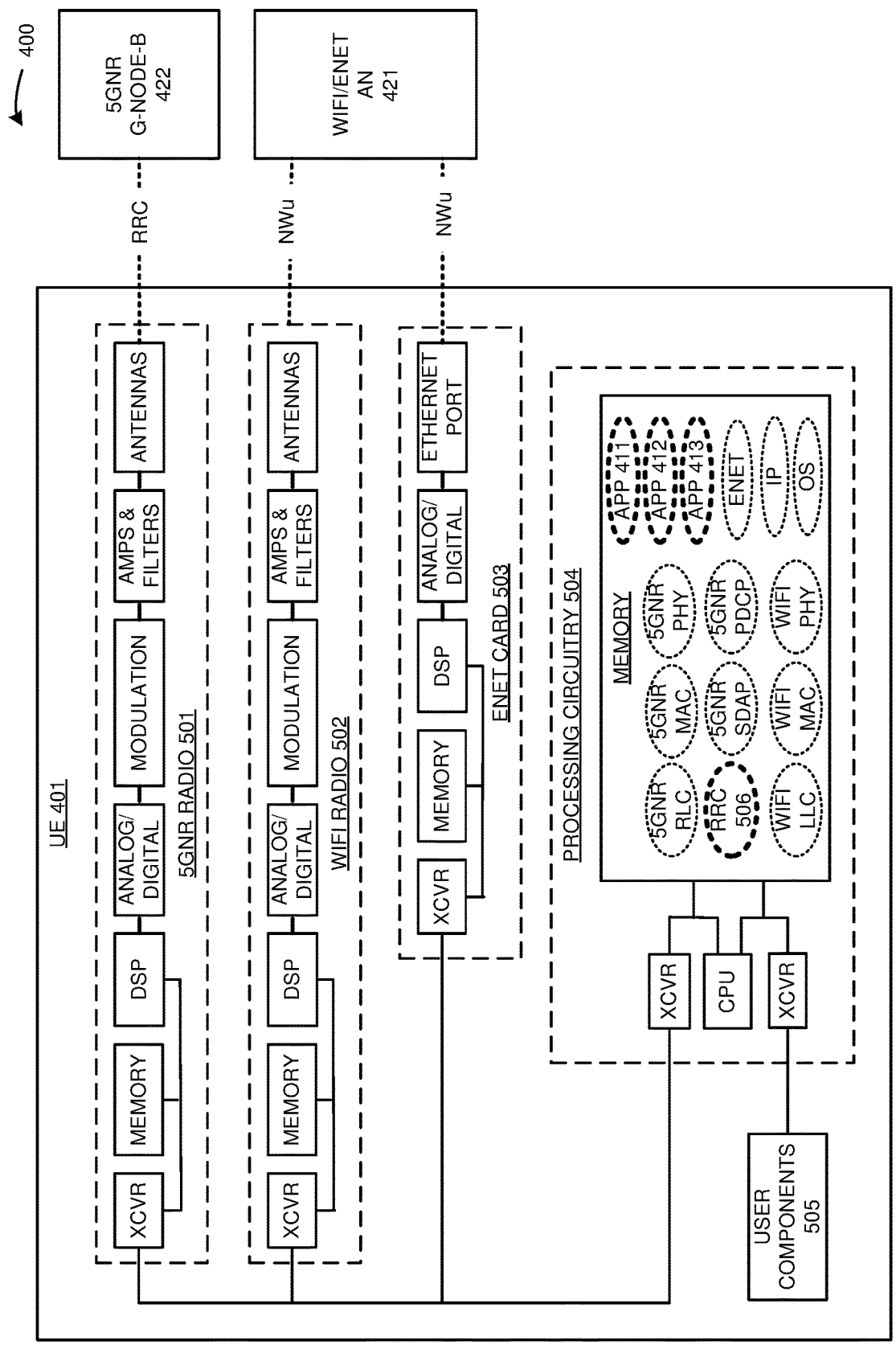
FIG. 5 illustrates a User Equipment (UE) in the 5G wireless network that uses the optimal wireless network slices for the user applications.

FIG. 5 illustrates User Equipment (UE) 401 in 5G wireless network 400 that uses optimal wireless network slices 450, 460, and 470 for user applications 411-413. UE 401 comprises an example of UE 101, although UE 101 may differ. UE 401 comprises SGNR radio 501, WIFI radio 502, ENET card 503, processing circuitry 504, and user components 505. Radios 501-502 comprise antennas, amplifiers, filters, modulation, analog-to-digital interfaces, DSP, memory, and transceivers that are coupled over bus circuitry. ENET card 503 comprises an ENET port, analog-to-digital interfaces, DSP, memory, and transceivers that are coupled over bus circuitry. Processing circuitry 504 comprises memory, CPU, user interfaces and components, and transceivers that are coupled over bus circuitry. The memory in processing circuitry 504 stores an operating system, user applications, and network applications like Internet Protocol Layers (IP), IEEE 802.3 Layers (ENET), IEEE 802.11 (WIFI) Physical Layer (PHY), WIFI Media Access Control (MAC), WIFI Logical Link Control (LLC), SGNR PHY, SGNR MAC, SGNR Radio Link Control (RLC), SGNR Packet Data Convergence Protocol (PDCP), SGNR Service Data Adaptation Protocol (SDAP), and SGNR Radio Resource Control (RRC). In some examples, UE 401 may omit one or two of the SGNR, WIFI, and ENET portions of UE 401. For example, UE 401 could be a WIFI-only device or a WIFI/ENET device. UE 401 could also use other non-3GPP protocols (like bluetooth and narrowband internet-of-things) in addition to or instead of WIFI and ENET.

The antennas in 5GNR radio 501 are wirelessly coupled to 5GNR gNodeB 422 over a wireless link that supports RRC. The antennas in WIFI radio 601 are wirelessly coupled to WIFI/ENET AN 421 over a wireless link that supports NWu. The ENET port in ENET card 602 is wireline coupled to WIFI/ENET AN 421 over a metal and/or glass link that supports NWu. Transceivers in 5GNR radio 501, WIFI radio 502, and ENET card 503 are coupled to transceivers in processing circuitry 504. Transceivers in processing circuitry 504 are coupled to user components 505 like displays, controllers, and memory. The CPU in processing circuitry 504 executes the operating system, user applications, and 5GNR network applications to exchange 5GNR signaling and data with 5GNR gNodeB 422 over 5GNR radio 501. The CPU in processing circuitry 504 executes the operating system, user applications, and WIFI network applications to exchange WIFI data with WIFI/ENET AN 421 over WIFI radio 502. The CPU in processing circuitry 504 executes the operating system, user applications, and ENET applications to exchange WIFI data and ENET data with WIFI/ENET AN 421 over ENET card 503.

In some examples, the WIFI LLC in UE 401 registers with WIFI/ENET AN 421 over a Y1. 5GNR RRC 506 then registers with 3GPP IWF 423 over the Y1, WIFI/ENET AN 421, and Y2 to establish the NWu. 3GPP IWF 423 selects 5GC AMF 431 for UE 401 based on UE location, requested CAAR slice, or last/current AMF. 5GNR RRC 506 in UE 401 registers with 3GPP AMF 431 over the NWu, IWF 431, and N2 to establish an N1 over the N2, IWF 423, and NWu. Non-3GPP IWF 423 directs RRC 506 to use a bearer from UE 401 to CAAR 425 over AN 421, IWF 422, and UPF 424. The WIFI or ENET applications in UE 401 receive user content from CAAR 425 over the bearer that traverses AN 421, IWF 423, and UPF 424.

In some examples, RRC 506 in UE 401 registers with 5GNR gNodeB 422. 5GNR gNodeB 422 selects 5GC AMF 431 for UE 401 based on UE location, requested CAAR slice, or last/current AMF. 5GNR RRC 506 in UE 401 registers with 3GPP AMF 431 and they establish an N1 over 5GNR gNodeB 422. 5GNR gNodeB 422 directs RRC 506 to use a bearer from UE 401 to CAAR 425 over 5GNR gNodeB 422. The 5GNR applications in UE 401 receive user content from CAAR 425 over the bearer that traverses gNodeB 422 and UPF 424.

UE 401 downloads user application 411 from CAAR 425 over one of the bearers. In response to the download, RRC 506 receives a slice message from AMF 431 over one of the N1s that indicates user application 411 and wireless network slice 470. The slice message also indicates slice access instructions like RRC reconfiguration instructions, non-3GPP reconfiguration instructions, SMF slice request instructions, and 5GNR/WIFI/ENET priority.

In this example, RRC 506 in UE 401 uses RRC reconfiguration to access optimal network slices 450, 460, and 470 that have different AMFs 451, 461, and 471 than serving AMF 431. In other examples, RRC 506 in UE 401 directly requests the optimal slices from the serving SMF or AMF over one of the N1s. In response to the slice message from the serving AMF, RRC 506 performs an RRC reconfiguration with 5GNR gNodeB 422 or non-3GPP reconfiguration with non-3GPP IWF 423 to request optimal wireless network slice 470. 5GNR gNodeB 422 or 3GPP IWF 423 then select 5GC AMF 471 for UE 401 based on requested wireless network slice 470. RRC 506 registers with 3GPP AMF 471 and they establish an N1 over the network path that traverses AN 421 and IWF 423 or the path that traverses gNodeB 422. 5GNR gNodeB 422 or IWF 423 direct RRC 506 in UE 401 to use a bearer supported by optimal slice 470. User application 411 now communicates over optimal wireless network slice 470 using the network path that traverses AN 421 and IWF 423 or the path that traverses gNodeB 422.

Subsequently UE 401 downloads user application 412 in the manner described above for application 411. In response to the download, RRC 506 receives a slice message from AMF 431 (or the serving AMF) that indicates application 412 and wireless network slice 460. The slice message also indicates slice access instructions like RRC reconfiguration, non-3GPP reconfiguration, SMF slice request, 5GNR/WIFI/ENET priority, and the like. In this example, RRC 506 in UE 401 uses RRC reconfiguration to access optimal network slice 460 as described above for slice 470. User application 412 in UE 401 now communicates over optimal wireless network slice 460 using the network path that traverses AN 421 and IWF 423 or the path that traverses gNodeB 422.

Subsequently UE 401 downloads user application 413 as described above for application 411. In response to the download, RRC 506 receives a slice message from AMF 431 (or the serving AMF) that indicates application 413 and wireless network slice 450. The slice message also indicates slice access instructions like RRC reconfiguration, non-3GPP reconfiguration, SMF slice requests, and 5GNR/WIFI/ENET priority. In this example, RRC 506 in UE 401 uses non-3GPP reconfiguration to access optimal network slice 450 over IWF 423. User application 413 in UE 401 now communicates over optimal wireless network slice 450 using one of the network path over AN 421 and IWF 423 or the path over gNodeB 422.

Figure 6:
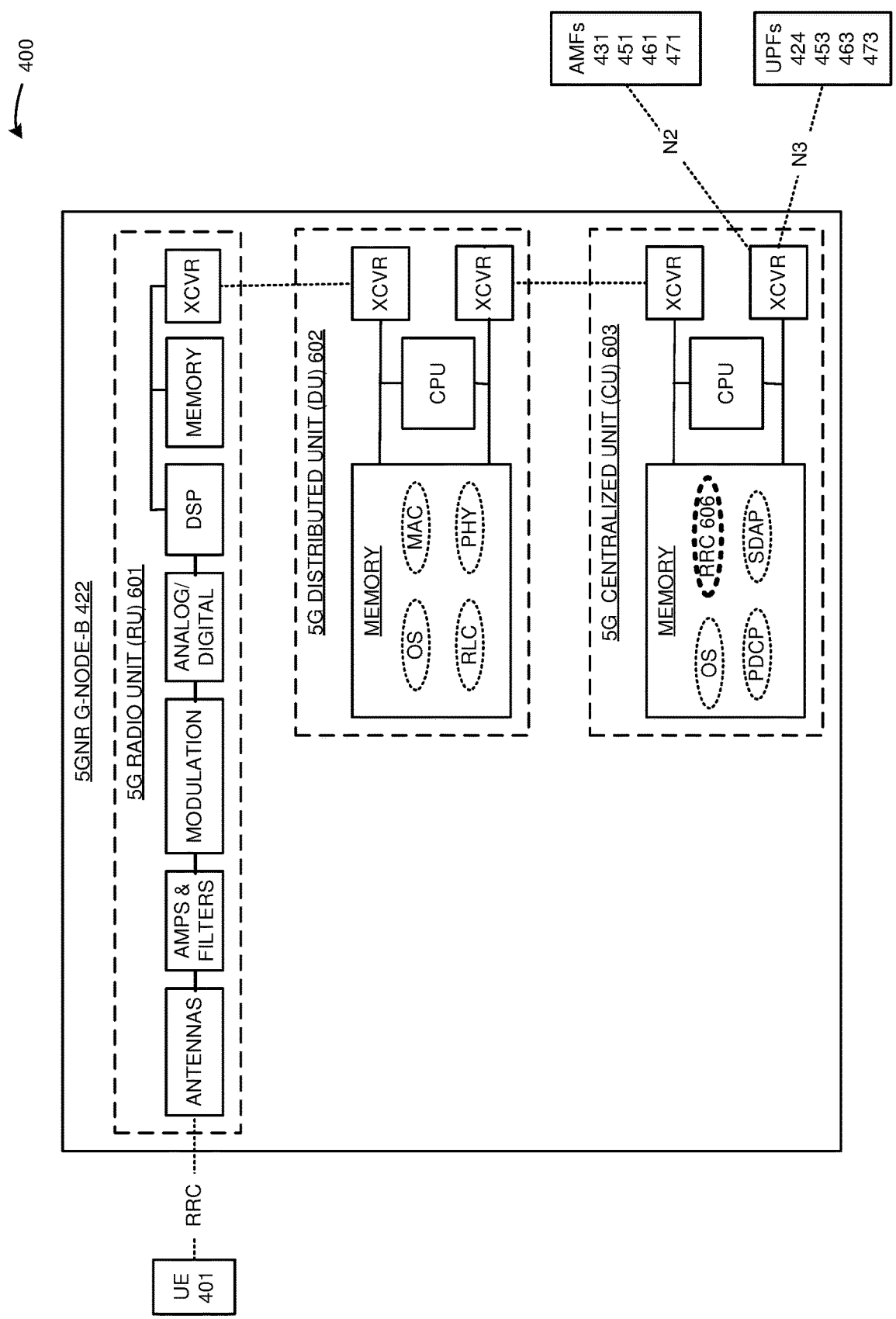
FIG. 6 illustrates Fifth Generation New Radio (5GNR) gNodeB in the 5G wireless network that uses the optimal wireless network slices for the user applications.

FIG. 6 illustrates Fifth Generation New Radio (5GNR) gNodeB 422 in 5G wireless network 400 that uses optimal wireless network slices 450, 460, and 470 for user applications 411-413. 5GNR gNodeB 422 comprises an example of 3GPP access node 122, although access node 122 may differ. 5GNR gNodeB 422 comprises 5G Radio Unit (RU) 601, 5G Distributed Unit (DU) 602, and 5G Centralized Unit (CU) 603. RU 601 comprises antennas, amplifiers, filters, modulation, analog-to-digital interfaces, DSP, memory, and transceivers that are coupled over bus circuitry. DU 602 comprises memory, CPU, and transceivers that are coupled over bus circuitry. The memory in DU 602 stores operating systems and 5GNR network applications like PHY, MAC, and RLC. CU 603 comprises memory, CPU, and transceivers that are coupled over bus circuitry. The memory in CU 603 stores an operating system and 5GNR network applications like Packet Data Convergence Protocol (PDCP), Service Data Adaptation Protocol (SDAP), and Radio Resource Control (RRC) 606.

The antennas in RU 601 are wirelessly coupled to UE 401 over 5GNR links that support RRC. Transceivers in RU 601 are coupled to transceivers in DU 602 over fronthaul links like enhanced Common Public Radio Interface (eCPRI). Transceivers in DU 602 are coupled to transceivers in CU 603 over mid-haul links. Transceivers in CU 603 are coupled to 5GC AMFs 431, 451, 461, and 471 and UPFs 433, 453, 463, and 473 over backhaul links. The CPU in DU 602 executes an operating system, PHY, MAC, and RLC to exchange 5GNR data units with RU 601 and to exchange 5GNR data units with CU 603. The CPU in CU 603 executes an operating system, PDCP, SDAP, and RRC 606 to exchange 5GC N2 signaling with the AMF and N3 data with the UPFs.

UE 401 attaches to RRC 606 in CU 603 and establishes an RRC connection. 5GNR RRC 606 selects 5GC AMF 431 based on location, requested CAAR slice, last/current AMF, default, or some other factor. RRC 606 registers UE 401 with 5GC AMF 431 over the N2. 5GC AMF 431 signals RRC 606 over the N2 to serve UE 401 over a wireless RRC connection and over an N3 between the SDAP in CU 803 and 5GC UPF 424. UE 401 and the SDAP in CU 603 exchange user data over the RRC connection. The SDAP in CU 603 and 5GC UPF 424 exchange the user data over the N3. In particular, the SDAP in CU 603 receives user applications 411-413 over 5GC UPF 424 and the N3. The SDAP in CU 603 transfers user applications to UE 401 over the RRC connection. RRC 606 in CU 603 receives slice messages for UE 401 over the N1 in the N2 and forwards the slice messages to UE 401 over the N1 in the RRC connection. The slice messages indicate the optimal network slices for the downloaded user applications. The slice messages indicate how to access the slices. If RRC reconfiguration is required, then RRC 606 receives an RRC reconfiguration request from UE 401 that indicates a requested slice and RRC 606 reselects an optimal AMF for the requested slice. For example, UE 401 may perform an RRC reconfiguration to request optimal wireless network slice 470, and RRC 606 would then select 5GC AMF 471 for UE 401 based on requested wireless network slice 470. RRC 606 supports N1 between UE 401 and the optimal AMFs. RRC 606 controls the delivery of wireless bearers to UE 401 over the RRC connection and the N3 to the UPFs. Under the control of RRC 606, the SDAP in CU 603 exchanges application data with a network application in UE 401 and exchanges the application data with the optimal network slice for the user application.

Figure 7:
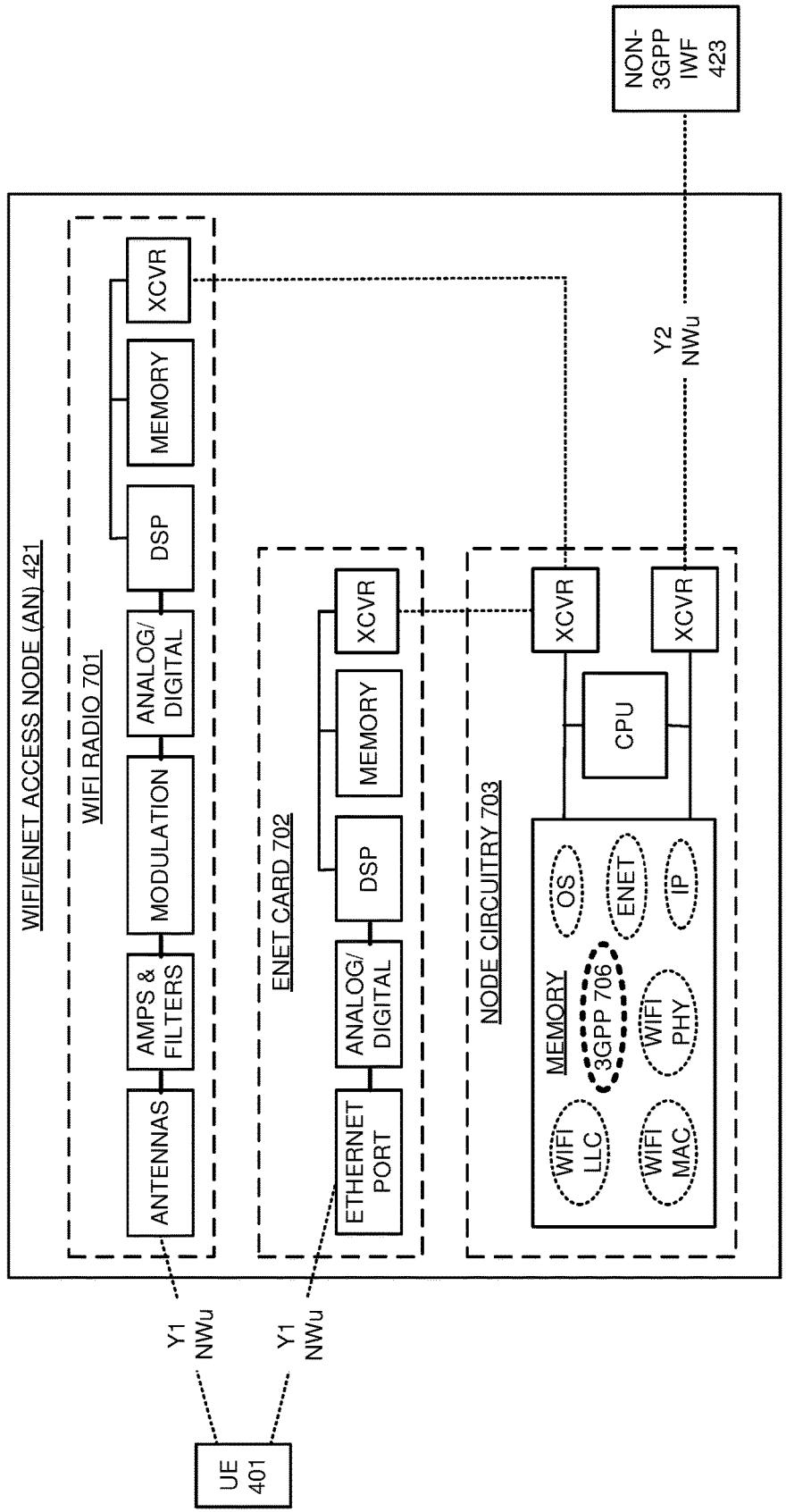
FIG. 7 illustrates an IEEE 802.11 (WIFI) and IEEE 802.3 (ENET) Access Node (AN) in the 5G wireless network that uses the optimal wireless network slices for the user applications.

FIG. 7 illustrates WIFI/ENET Access Node (AN) 421 in 5G wireless network 400 that uses optimal wireless network slices 450, 460, and 470 for user applications 411-413. WIFI/ENET AN 421 comprises an example of non-3GPP access node 121, although node 121 may differ. WIFI/ENET access node 421 comprises WIFI radio 701, ENET card 702, and node circuitry 703. WIFI radio 701 comprises antennas, amplifiers, filters, modulation, analog-to-digital interfaces, DSP, memory, and transceivers that are coupled over bus circuitry. ENET card 702 comprises ENET ports, analog-to-digital interfaces, DSP, memory, and transceivers that are coupled over bus circuitry. Node circuitry 703 comprises memory, CPU, and transceivers that are coupled over bus circuitry. The memory in node circuitry 703 stores operating systems and network applications like WIFI PHY, WIFI MAC, WIFI LLC, ENET, IP, and 3GPP Networking (3GPP) 706.

The antennas in WIFI radio 701 are wirelessly coupled to UE 401 over wireless links that support Y1 and NWu. The ENET port in ENET card 702 is wireline coupled to UE 401 over metal and/or glass links that support Y1 and NWu. Transceivers in WIFI radio 701 and ENET card 702 are coupled to transceivers in node circuitry 703. Transceivers in node circuitry 703 are coupled to transceivers in non-3GPP IWF 421 over links that support Y2 and NWu. The CPU in node circuitry 703 executes the operating system and network applications to exchange data and signaling with UE 401 over the Y1 and NWu and to exchange data and signaling with non-3GPP IWF 421 over the Y2 and NWu.

In some examples, WIFI radio 701 and the WIFI network applications are omitted, and ENET card 702 and the ENET applications are used as described. In other examples, ENET card 702 and the ENET applications are omitted, and WIFI radio 701 and the WIFI network applications are used as described. Other equipment and wireless protocols like network applications and radios for bluetooth or narrowband internet-of-things could be used in addition or as an alternative.

In some examples, UE 401 attaches to the WIFI network applications in node circuitry 703 over WIFI radio 701 and the Y1. UE 401 registers with non-3GPP IWF 421 over the Y1, WIFI radio 701, 3GPP 706, and Y2. UE 401 and non-3GPP IWF 421 establish the NWu over WIFI radio 701 and 3GPP 706. UE 401 registers with 5GC AMF 431 over the over the NWu, non-3GPP IWF 423, and N2. UE 401 and AMF 431 establish an N1 over the NWu and N2 that traverse WIFI radio 701, 3GPP 706, and non-3GPP IWF 423. UE 401 and non-3GPP IWF 421 exchange user data and N1 signaling over the NWu.

In some examples, UE 401 attaches to the ENET applications in node circuitry 703 over ENET card 702 and the Y1. UE 401 registers with non-3GPP IWF 421 over the Y1, ENET card 702, 3GPP 706, and Y2. UE 401 and non-3GPP IWF 421 establish the NWu over ENET card 702 and 3GPP 706. UE 401 registers with the 5GC AMFs over the over the NWu and N2 that traverse ENET card 702, 3GPP 706, and non-3GPP IWF 421. UE 401 and AMF 431 establish an N1 over the NWu and N2 that traverse ENET card 702, 3GPP 706, and non-3GPP IWF 421. UE 401 and non-3GPP IWF 421 exchange user data and N1 signaling over the NWu that traverses ENET card 702 and 3GPP 706. The user data includes user applications 411-413 and corresponding application data. The N1 signaling includes slice messages that indicate optimal network slices for user applications 411-413 and slice access instructions.

Figure 8:
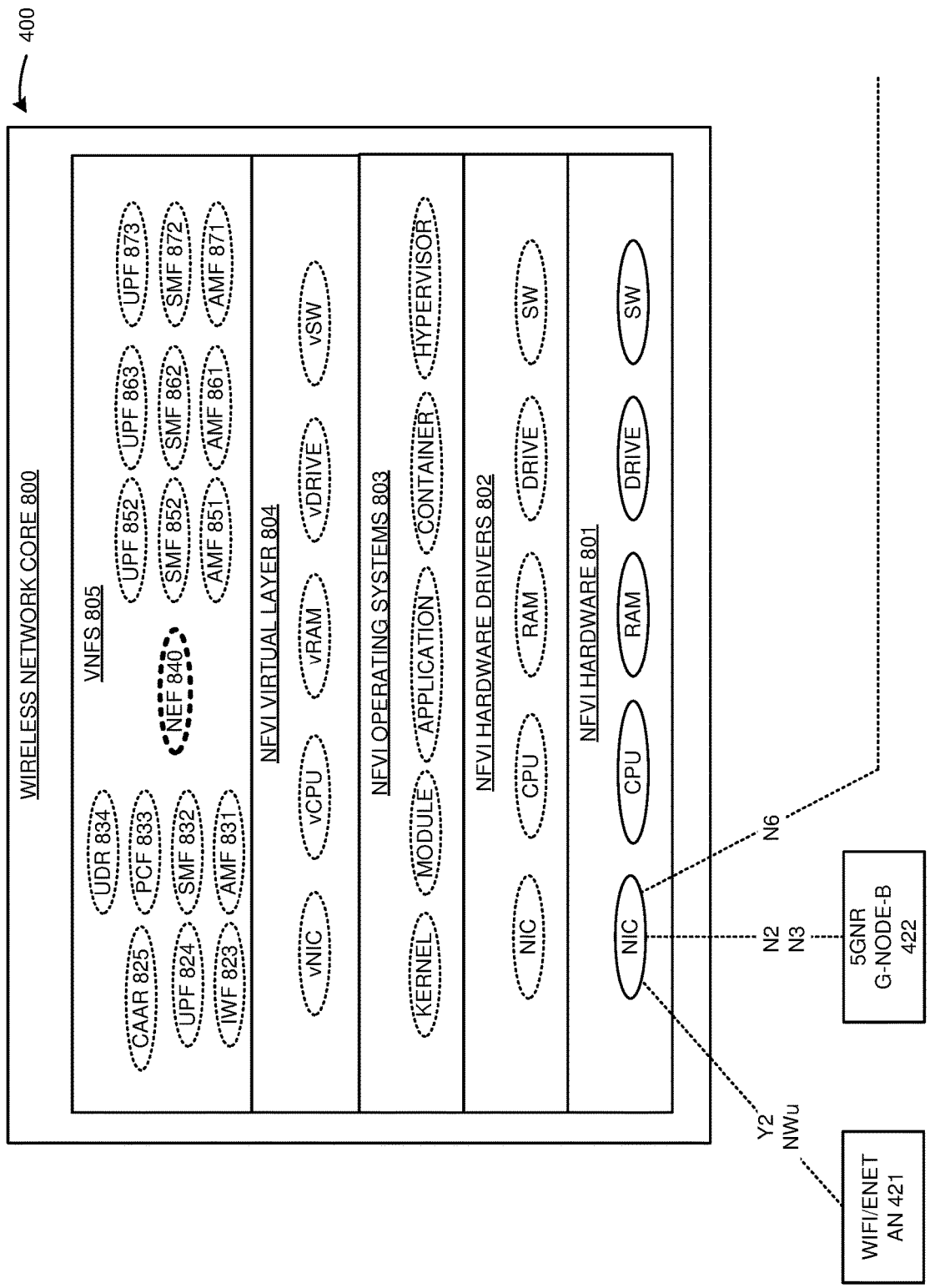
FIG. 8 illustrates a wireless network core in the 5G network that uses the optimal wireless network slices for the user applications.

FIG. 8 illustrates wireless network core 800 in 5G network 400 that uses optimal wireless network slices 450, 460, and 470 for user applications 411-413. Network core 800 comprises an example of network functions 121-124, although functions 121-124 may vary from this example. Network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise non-3GPP IWF 823, UPF 824, CAAR 825, AMF 831, SMF 832, PCF 833, UDR 834, AMF 851, SMF 852, UPF 853, AMF 861, SMF 862, UPF 863, AMF 871, SMF 872, and UPF 873. Other VNFs like Authentication Server Function (AUSF) and Network Repository Function (NRF) are typically present but are omitted for clarity. Network core 800 may be located at a single site or be distributed across multiple geographic locations. The NIC in NFVI hardware 801 are coupled to WIFI/ENET AN 421 over Y2 and NWu, to 5GNR gNodeB 422 over N2 and N3, and to external systems over N6. NFVI hardware 801 executes NFVI hardware drivers 802, NFVI operating systems 803, NFVI virtual layer 804, and NFVI VNFs 805 to form IWF 423, UPF 424, CAAR 425, AMF 431, SMF 432, PCF 433, UDR 434, AMF 451, SMF 452, UPF 453, AMF 461, SMF 462, UPF 463, AMF 471, SMF 472, and UPF 473.

Figure 9:
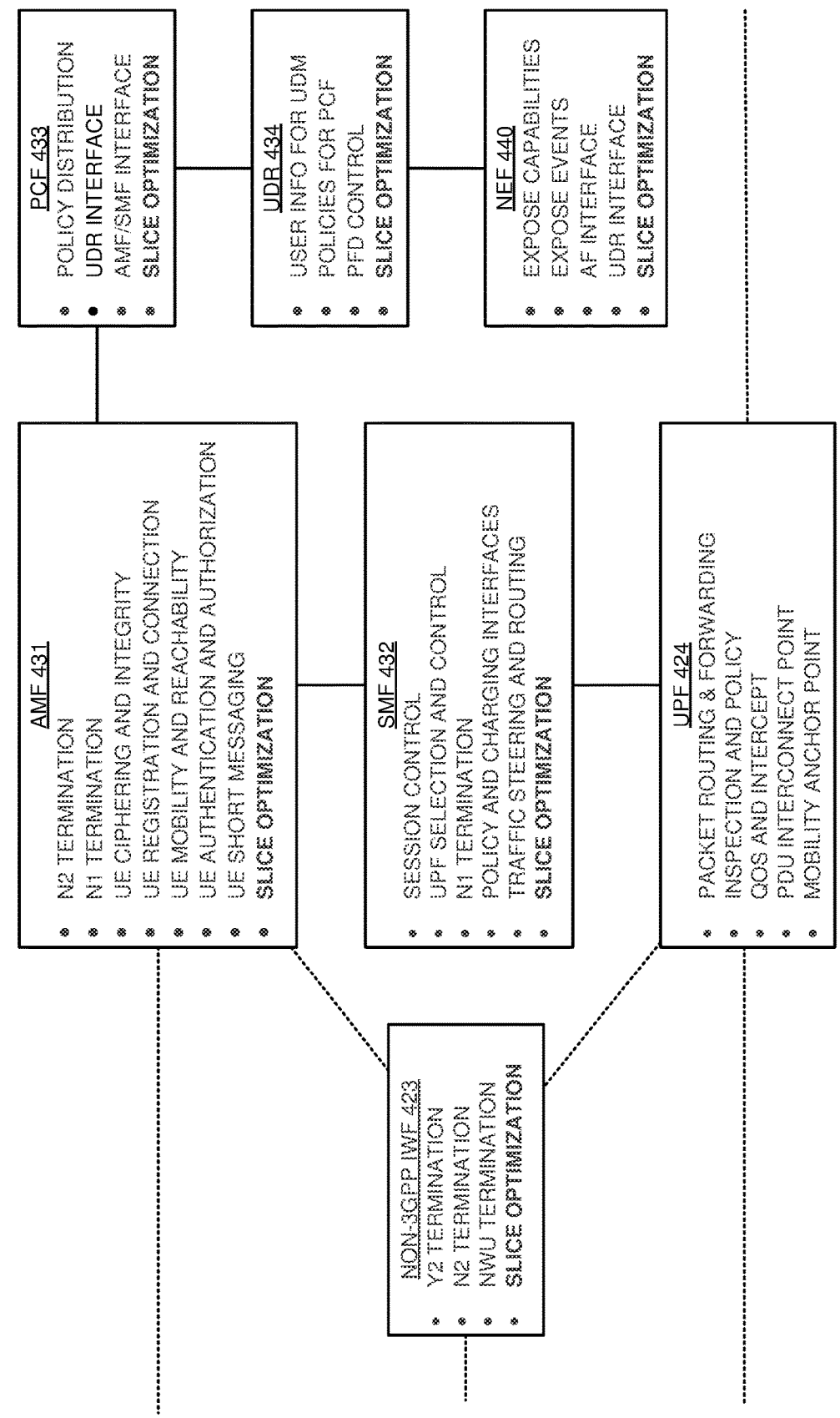
FIG. 9 further illustrates the wireless network core in the 5G network that uses the optimal wireless network slices for the user applications.

FIG. 9 further illustrates wireless network core 800 in 5G network 400 that uses optimal wireless network slices 450, 460, and 470 for user applications 411-413. Non-3GPP IWF 421 performs Y2 termination, N2 termination, NWu termination, Y2/N2 interworking, and slice optimization for user applications 411-413. UPF 424 performs packet routing & forwarding, packet inspection, QoS handling, PDU interconnection, mobility anchoring, and slice optimization for user applications 411-413. AMF 431 performs N2 termination, N1 termination, N2/N1 and N2/N2 interworking, UE ciphering & integrity protection, UE registration and connection, UE connection/mobility management, UE authentication and authorization, UE short messaging, and slice optimization for user applications 411-413. SW 432 performs session establishment/management, network address allocation, N1 termination, downlink data notification, traffic steering and routing, and slice optimization for user applications 411-413. PCF 433 performs policy distribution to UDRs, SMFs, and AMFs and performs slice optimization for user applications 411-413. UDR 834 stores user information for the UDM, stores policies for PCF 433, controls Packet Flow Descriptors (PFDs), and performs slice optimization for user applications 411-413. NEE 440 exposes network capabilities/events to AFs and UDRs and performs slice optimization for user applications 411-413.

UE 401 registers with 3GPP IWF 423 to establish their NWu. 3GPP IWF 423 selects 5GC AMF 431 for UE 401 based on UE location, requested slice, or last/current AMF. UE 401 registers with 3GPP AMF 431 to establish an N1 over the NWu and N2 that traverse 3GPP IWF 423. AMF 431 directs SMF 432 to establish a bearer for UE 401 to CAAR 425 over non-3GPP IWF 423. SMF 432 drives UPF 424 to serve the bearer to UE 401. AMF 431 directs UE 401 to use the bearer to CAAR 425. UE 401 and CAAR 425 communicate over the bearer that traverses AN 421, IWF 423, and UPF 424.

UE 401 registers with 3GPP AMF 431 to establish another N1 over 5GNR gNodeB 422. AMF 431 directs gNodeB 422 to establish a bearer for UE 401 to UPF 424. AMF 431 directs SMF 432 to extend the bearer for UE 401 from gNodeB 422 to CAAR 425 over 5GNR gNodeB 422. SMF 432 drives UPF 424 to serve the bearer to UE 401. 5GNR gNodeB 422 directs UE 401 to use the bearer to CAAR 425. UE 401 and CAAR 425 communicate over the bearer that traverses 5GNR gNodeB 422 and UPF 424.

UE 401 download user application 411 from CAAR 425 over the path that traverses AN 421, IWF 423, and UPF 424 or the path that traverses gNodeB 422 and UPF 424. In response to the download, CAAR 425 transfers a download notice to NEF 440 that indicates that UE 401 has downloaded user application 411. NEF 440 transfers a corresponding download message to UDR 434 that indicates that UE 401 has downloaded user application 411. In response to the UE 401 download of user application 411, UDR 434 queries a UDM, subscriber database, or some other UE provisioning system with a UE ID for UE 401 to identify a set of available network slices 450, 460, and 470 for UE 401. UDR 434 also receives slice performance levels for throughput, latency, reliability, mobility, cost, and the like. The UE ID comprises an IMSI, SUPI, SUCI, or some other UE reference data. UDR 434 also queries with an application ID for user application 411 to obtain key application requirements for throughput, latency, reliability, mobility, cost, and the like. UDR 434 determine the closeness of the key application requirements for application 411 to the corresponding slice performance levels of slices 450, 460, and 470. UDR 434 selects slice 470 for UE 401 and application 411 and transfers a UE message to PCF 433 that indicates UE 401, user application 411, and optimal wireless network slice 470.

PCF 433 performs a UE Access Selection and Policy Information Update for UE 401, application 411, and slice 470. PCF 433 transfers a resulting policy message to AMF 431 that indicates UE 401, application 411, and slice 470. AMF 431 receives the policy message from PCF 433 and responsively transfers a slice message indicating application 411 and wireless network slice 470 to UE 401. The slice message comprises NAS data that traverses an N1 link between AMF 431 and UE 401.

In this example, UE 401 uses RRC or non-3GPP reconfiguration to access optimal network slices 450, 460, and 470 that have different AMFs 451, 461, and 471 from serving AMF 431. In other examples, UE 401 could access other optimal network slices that do not have an AMF by requesting the slice from SMF 432 (or AMF 431) without RRC/non-3GPP reconfiguration.

5GNR gNodeB 422 or 3GPP IWF 423 select 5GC AMF 471 for UE 401 based on requested wireless network slice 470. UE 401 registers with 3GPP AMF 471 and they establish an N1 over AN 421-IWF 423 or gNodeB 422. AMF 471 directs gNodeB 422 or IWF 423 to establish a bearer for UE 401 to UPF 474. AMF 471 directs SMF 472 to extend the bearer for UE 401 over UPF 473. SMF 472 drives UPF 473 to serve the bearer to UE 401. AMF 471 and gNodeB 422 direct UE 401 to use the bearer over optimal wireless network slice 470. User application 411 in UE 401 now communicates over optimal wireless network slice 470 using either AN 421-IWF 423 or gNodeB 422.

Subsequently UE 401 may again register with AMF 431 over AN 421-IWF 423 or gNodeB 422 to download user application 412. AMF 431 directs gNodeB 422 or IWF 423 to establish a bearer for UE 401 to UPF 424. AMF 431 directs SMF 432 to extend the bearer to CAAR 425. SMF 432 drives UPF 424 to serve the bearer to UE 401. AMF 431 and/or gNodeB 422 direct UE 401 to use the bearer to CAAR 425. UE 401 may now download user application 412 from CAAR 425 over AN 421-IWF 423-UPF 424 or gNodeB 422-UPF 424. In either case, CAAR 425 transfers a download notice to NEF 440 that indicates that UE 401 has downloaded user application 412. NEF 440 transfers a corresponding download message to UDR 434 that indicates that UE 401 has downloaded user application 412. UDR 434 queries to identify the set of available network slices for UE 401 and their performance levels for throughput, latency, reliability, mobility, cost, and the like. UDR 434 also queries with an application ID for user application 412 to obtain key application requirements for throughput, latency, reliability, mobility, cost, and the like. UDR 434 determine the closeness of the key application requirements for application 412 to the corresponding slice performance levels of slices 450, 460, and 470. UDR 434 selects the closest one of slices 450, 460, and 470 as the optimal slice for UE 401 and user application 412. UDR 434 selects slice 460 for UE 401 and application 412 and transfers a UE message to PCF 433 that indicates UE 401, user application 412, and optimal wireless network slice 460.

PCF 433 performs a UE Access Selection and Policy Information Update for UE 401, application 412, and slice 460. PCF 433 transfers a resulting policy message that indicates UE 401, application 412, and slice 460 to AMF 431. AMF 431 receives the policy message from a PCF 433 and responsively transfers a slice message indicating application 412 and wireless network slice 460 to UE 401. The slice message comprises NAS data traverses one of the N1 links between AMF 431 and UE 401.

In response to the slice message from AMF 431 and the download of user application 412, UE 401 performs an RRC or non-3GPP reconfiguration with 5GNR gNodeB 422 or non-3GPP IWF 423 to request optimal wireless network slice 460. 5GNR gNodeB 422 or 3GPP IWF 423 select 5GC AMF 461 for UE 401 based on requested wireless network slice 460. UE 401 registers with 3GPP AMF 461 and they establish an N1 over AN 421-IWF 423 or gNodeB 422. AMF 461 directs SMF 462 to establish a bearer for UE 401 over gNodeB 422 or IWF 423. SMF 462 drives UPF 463 to serve the bearer to UE 401. AMF 461 and gNodeB 422 direct UE 401 to use the bearer over optimal wireless network slice 460. User application 412 in UE 401 now communicates over optimal wireless network slice 460 using either AN 421-IWF 423 or gNodeB 422.

Subsequently UE 401 may again register with AMF 431 over AN 421-IWF 423 or gNodeB 422 to download user application 413. AMF 431 directs gNodeB 422 or IWF 423 to establish a bearer for UE 401 to UPF 424. AMF 431 directs SMF 432 to extend the bearer to CAAR 425. SMF 432 drives UPF 424 to serve the bearer to UE 401. AMF 431 and/or gNodeB 422 direct UE 401 to use the bearer to CAAR 425. UE 401 may now download user application 413 from CAAR 425 over UPF 424 and AN 421-IWF 423 or gNodeB 422. In either case, CAAR 425 transfers a download notice to NEF 440 that indicates that UE 401 has downloaded user application 413. NEF 440 transfers a corresponding download message to UDR 434 that indicates that UE 401 has downloaded user application 413. UDR 434 transfers a corresponding download message to UDR 434. UDR 434 queries to identify the set of available network slices for UE 401 and their performance levels for throughput, latency, reliability, mobility, cost, and the like. UDR 434 also queries with an application ID for user application 413 to obtain key application requirements for throughput, latency, reliability, mobility, cost, and the like. UDR 434 determine the closeness of the key application requirements for application 413 to the corresponding slice performance levels of slices 450, 460, and 470. UDR 434 selects the closest one of slices 450, 460, and 470 as the optimal slice for UE 401 and user application 413. UDR 434 selects slice 450 for UE 401 and application 413 and transfers a UE message to PCF 433 that indicates UE 401, user application 413, and optimal wireless network slice 450.

PCF 433 may perform a UE Access Selection and Policy Information Update for UE 401, application 413, and slice 450. PCF 433 transfers a resulting policy message that indicates UE 401, application 413, and slice 450 to AMF 431. AMF 431 receives the policy message from PCF 433 and responsively transfers a slice message indicating application 413 and wireless network slice 450 to UE 401. The slice message comprises NAS data traverses one of the N1 links between AMF 431 and UE 401.

In response to the slice message from AMF 431 and the download of user application 413, UE 401 performs an RRC or non-3GPP reconfiguration with 5GNR gNodeB 422 or non-3GPP IWF 423 to request optimal wireless network slice 450. 5GNR gNodeB 422 or 3GPP IWF 423 select 5GC AMF 451 for UE 401 based on requested wireless network slice 450. UE 401 registers with 3GPP AMF 451 and they establish an N1 over AN 421-IWF 423 or gNodeB 422. AMF 451 directs SMF 452 to establish a bearer for UE 401 over gNodeB 422 or IWF 423. SMF 452 drives UPF 453 to serve the bearer to UE 401. AMF 431 and gNodeB 422 direct UE 401 to use the bearer over optimal wireless network slice 450. User application 413 in UE 401 now communicates over optimal wireless network slice 450 using either AN 421-IWF 423 or gNodeB 422.

Figure 10:
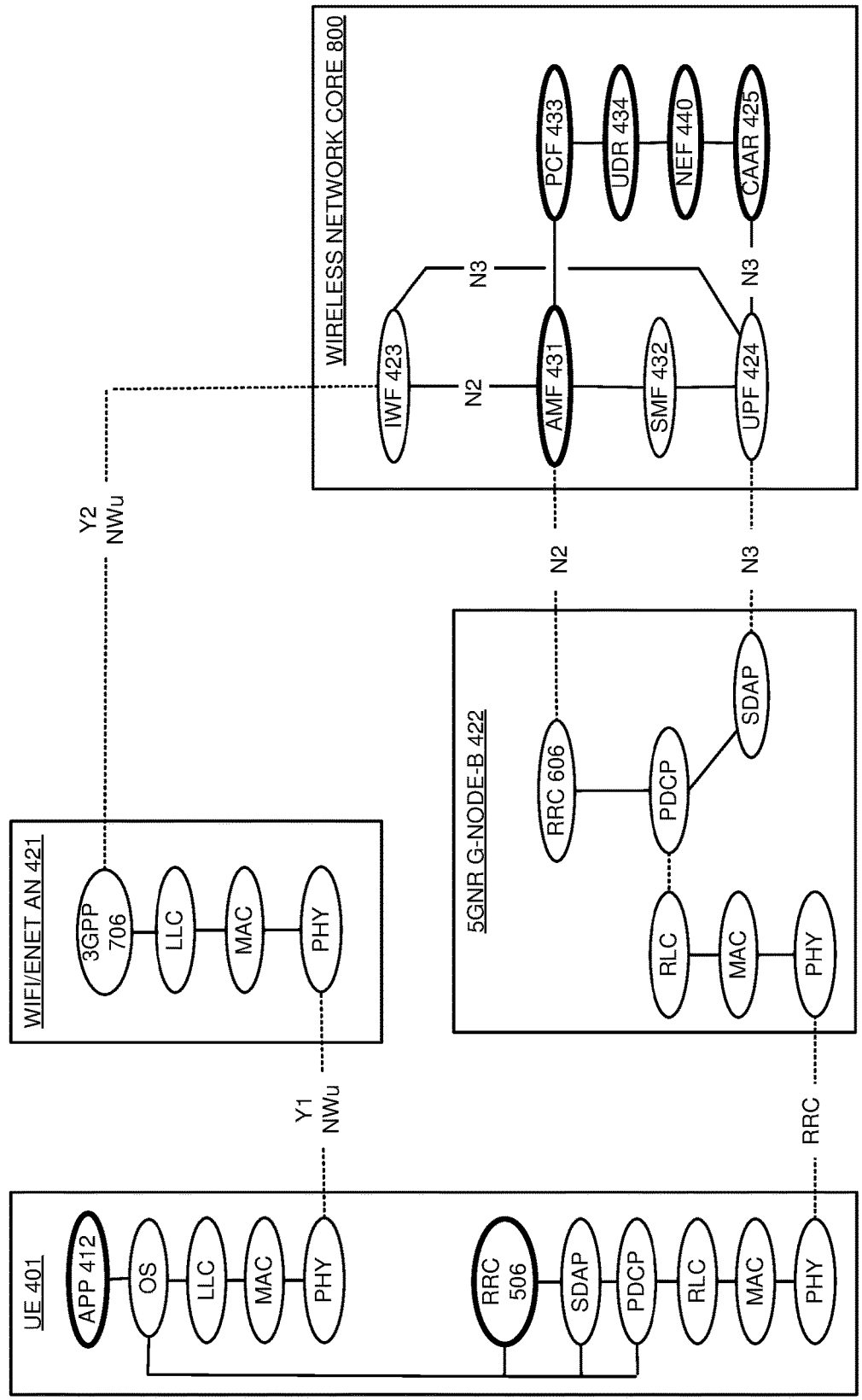
FIG. 10 illustrates an exemplary operation of the 5G network to use the optimal wireless network slices for the user applications.

FIG. 10 illustrates an exemplary operation of 5G network 400 to optimize wireless network slices 450, 460, and 470 for user applications 411-413 in UE 401. The operation is exemplary and may vary in other examples. In UE 401, the WIFI LLC registers with the WIFI LLC in WIFI/ENET AN 421 over the Y1. In UE 401, RRC 506 register with 3GPP IWF 423 over the Y1, 3GPP 706, and Y2. 3GPP IWF 423 selects 5GC AMF 431 for UE 401 based on UE location, requested slice, or last/current AMF. RRC 506 registers with 3GPP AMF 431 to establish an N1 over the N2 and NWu that traverse 3GPP 706 and IWF 423. RRC 506 also registers with RRC 606 in SGNR gNodeB 422. RRC 606 selects 5GC AMF 431 for UE 401 based on current AMF. RRC 506 UE 401 registers with 3GPP AMF 431 and they establish another N1 over RRC 606 in SGNR gNodeB 422.

In some examples, AMF 431 directs RRC 606 in gNodeB 422 to establish a bearer for UE 401 to UPF 424. AMF 431 directs SMF 432 to extend the bearer for UE 401 from the SDAP in gNodeB 422 to CAAR 425. SMF 432 drives UPF 424 to serve the bearer to UE 401. RRC 606 directs RRC 506 to use the bearer for CAAR 425 over gNodeB 422. In other examples, AMF 431 directs SMF 432 to establish a bearer for UE 401 to CAAR 425 over non-3GPP IWF 423. SMF 432 drives UPF 424 to serve the bearer to UE 401. AMF 431 directs RRC 506 in UE 401 to use the bearer to CAAR 425 over AN 421 and IWF 423.

UE 401 downloads user application 412 from CAAR 425 over the bearer that traverses AN 421, IWF 423, and UPF 424 or the bearer that traverses gNodeB 422 and UPF 424. In response to the download, CAAR 425 transfers a download notice to NEF 440 that indicates that UE 401 is downloading user application 412. NEF 440 transfers a corresponding download message to UDR 434 that indicates that UE 401 is downloading user application 412. In response to download message, UDR 434 determines a set of available network slices 450, 460, and 470 for UE 401. UDR 434 determines slice performance levels for throughput, latency, reliability, mobility, cost, and the like for available network slices 450, 460, and 470. UDR 434 determines key application requirements of user application 412 for throughput, latency, reliability, mobility, cost, and the like. UDR 434 determine the closeness of the key application requirements for application 412 to the corresponding slice performance levels of slices 450, 460, and 470. UDR 434 selects the closest one of slices 450, 460, and 470 to application 412 requirements as the optimal wireless network slice for user application 412.

In this example, UDR 434 selects slice 460 for UE 401 and application 412 and transfers a UE message to PCF 433 that indicates UE 401, user application 412, and optimal wireless network slice 460. PCF 433 transfers a policy message that indicates UE 401, application 412, and slice 460 to AMF 431. AMF 431 receives the policy message from PCF 433 and responsively transfers a slice message to RRC 506 in UE 401 that indicates application 412 and optimal wireless network slice 460. The slice message comprises NAS data that traverses one of the N1 links between AMF 431 and RRC 506 in UE 401.

Figure 11:
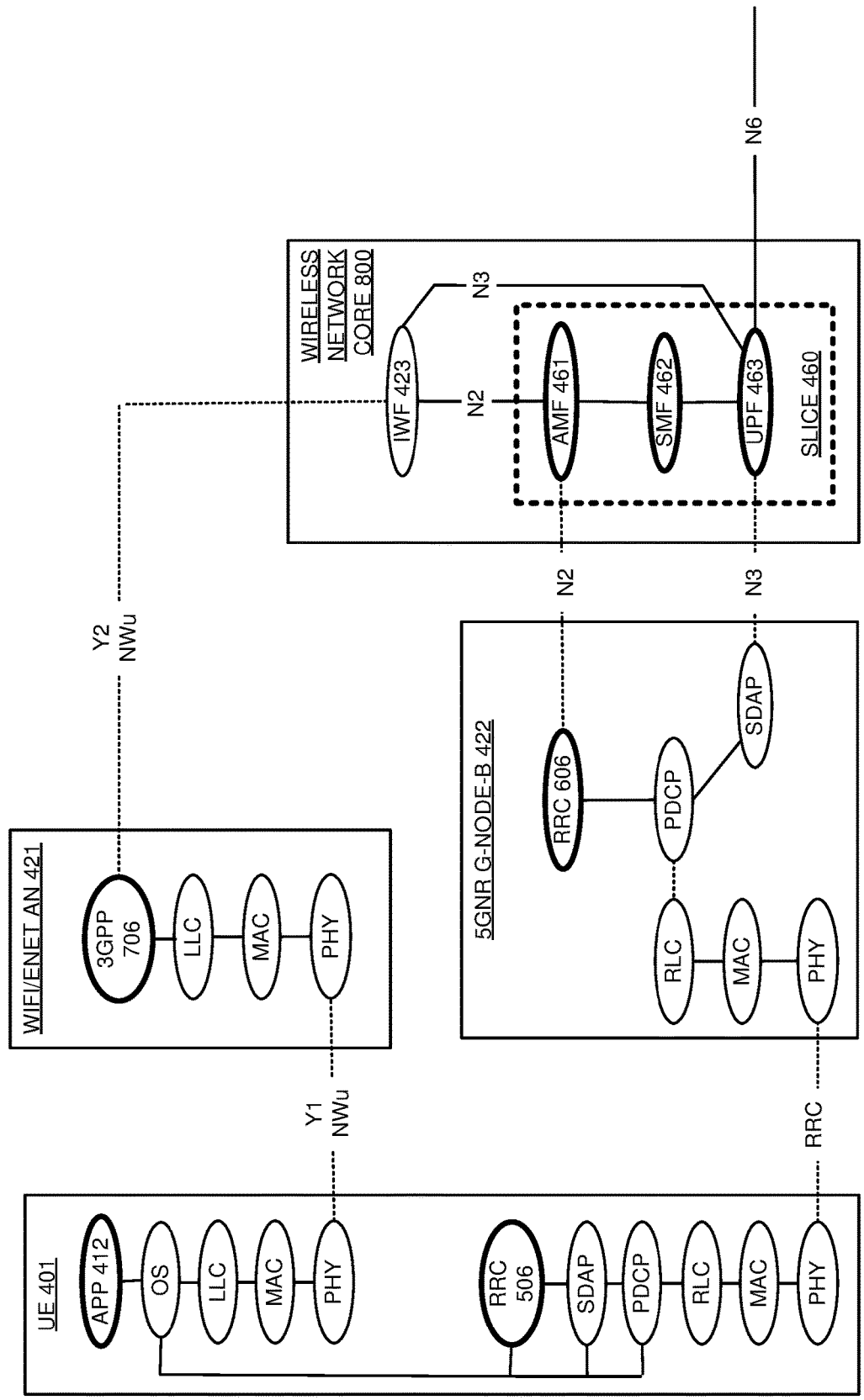
FIG. 11 further illustrates the exemplary operation of the 5G network to use the optimal wireless network slices for the user applications.

FIG. 11 further illustrates the exemplary operation of 5G network 400 to optimize wireless network slices 450, 460, and 470 for user applications 411-413 in UE 401. The operation is exemplary and may vary in other examples. RRC 506 in UE 401 and RRC 606 in SGNR gNodeB 422 may perform an RRC reconfiguration to request optimal wireless network slice 460. During the reconfiguration, RRC 606 selects 5GC AMF 461 for UE 401 based on requested wireless network slice 460. In other examples, RRC 506 and IWF 423 perform non-3GPP reconfiguration to request optimal wireless network slice 460. During the reconfiguration, IWF 423 selects 5GC AMF 461 for UE 401 based on requested wireless network slice 460.

RRC 506 registers with 3GPP AMF 461 and they establish an N1 over AN 421 and IWF 423 or over gNodeB 422. AMF 461 directs gNodeB 422 or IWF 423 to establish a bearer for UE 401 to UPF 463. AMF 461 directs SMF 462 to extend the bearer for UE 401 from gNodeB 422 or IWF 423 through UPF 463. SMF 462 drives UPF 463 to serve the bearer to UE 401. AMF 461 and possibly gNodeB 422 direct RRC 506 in UE 401 to use the bearer over optimal wireless network slice 460. User application 412 in UE 401 communicates over optimal wireless network slice 460 using either gNodeB 422 or AN 421 and IWF 423.

The wireless data network circuitry described above comprises computer hardware and software that form special-purpose network circuitry to optimize wireless network slices for user applications in UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to optimize wireless network slices for user applications in UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. At least one non-transient computer-readable medium comprising instructions to cause processing circuitry to use a wireless network slice for a user application and to use another wireless network slice for another user application by performing a method comprising:
   downloading the user application, and in response, receiving signaling that indicates the wireless network slice for the user application;
   downloading the other user application, and in response, receiving other signaling that indicates the other wireless network slice for the other user application;
   executing the user application, and in response, transferring a request for the wireless network slice and exchanging application data for the user application over the wireless network slice for the user application; and
   executing the other user application, and in response, transferring another request for the other wireless network slice and exchanging other application data for the other user application over the other wireless network slice for the other user application.

2. The at least one non-transient computer-readable medium of claim 1 wherein the user application comprises a machine control application and the wireless network slice comprises a machine control slice.

3. The at least one non-transient computer-readable medium of claim 1 wherein the user application comprises a media conferencing application and the wireless network slice comprises a media conferencing slice.

4. The at least one non-transient computer-readable medium of claim 1 wherein the user application comprises a social networking application and the wireless network slice comprises a social networking slice.

5. The at least one non-transient computer-readable medium of claim 1 wherein:
   the user application comprises a media conferencing application and the wireless network slice comprises a media conferencing slice; and
   the other user application comprises a social networking application and the other wireless network slice comprises a social networking slice.

6. The at least one non-transient computer-readable medium of claim 1 wherein:
   transferring the request for the wireless network slice comprises wirelessly transferring a Radio Resource Control (RRC) reconfiguration message; and
   transferring the other request for the other wireless network slice comprises wirelessly transferring another RRC reconfiguration message.

7. The at least one non-transient computer-readable medium of claim 1 wherein:
   downloading the user application, receiving the signaling, transferring the request, and exchanging the application data comprises wirelessly communicating with one or more Institute of Electrical and Electronic Engineers (IEEE) 802.11 (WIFI) access nodes; and
   downloading the other user application, receiving the other signaling, transferring the other request, and exchanging the other application data comprises wirelessly communicating with the one or more WIFI access nodes.

8. A method of operating a wireless communication device to use a wireless network slice for a user application and to use another wireless network slice for another user application, the method comprising:
   one or more radios wirelessly downloading the user application, and in response, wirelessly receiving signaling that indicates the wireless network slice for the user application and transferring the signaling to processing circuitry;
   the one or more radios wirelessly downloading the other user application, and in response, wirelessly receiving other signaling that indicates the other wireless network slice for the other user application and transferring the other signaling to the processing circuitry;
   the processing circuitry executing the user application, and in response, generating a request for the wireless network slice and exchanging application data for the user application with the one or more radios;
   the one or more radios wirelessly transferring the request for the wireless network slice and wirelessly exchanging the application data for the user application over the wireless network slice for the user application;
   the processing circuitry executing the other user application, and in response, generating another request for the other wireless network slice and exchanging other application data for the other user application with the one or more radios; and
   the one or more radios wirelessly transferring the other request for the other wireless network slice and wirelessly exchanging the other application data for the other user application over the other wireless network slice for the other user application.

9. The method of claim 8 wherein the user application comprises a machine control application and the wireless network slice comprises a machine control slice.

10. The method of claim 8 wherein the user application comprises a media conferencing application and the wireless network slice comprises a media conferencing slice.

11. The method of claim 8 wherein the user application comprises a social networking application and the wireless network slice comprises a social networking slice.

12. The method of claim 8 wherein:
   the user application comprises a media conferencing application and the wireless network slice comprises a media conferencing slice; and
   the other user application comprises a social networking application and the other wireless network slice comprises a social networking slice.

13. The method of claim 8 wherein:
   the processing circuitry generating the request for the wireless network slice and generating the other request for the other wireless network slice comprises generating Radio Resource Control (RRC) reconfiguration messages;
   the one or more radios wirelessly transferring the request for the wireless network slice and wirelessly transferring the other request for the other wireless network slice comprises wirelessly transferring the RRC reconfiguration messages.

14. The method of claim 8 wherein the one or more radios wirelessly downloading the user application and the other user application, wirelessly receiving the signaling and the other signaling, wirelessly transferring the request and the other request, and wirelessly exchanging the application data and the other application data comprises wirelessly communicating with one or more Institute of Electrical and Electronic Engineers (IEEE) 802.11 (WIFI) access nodes.

15. A wireless communication device to use a wireless network slice for a user application and to use another wireless network slice for another user application, the wireless communication device comprising:
- one or more radios to wirelessly download the user application, and in response, to wirelessly receive signaling that indicates the wireless network slice for the user application and to transfer the signaling to processing circuitry;
- the one or more radios to wirelessly download the other user application, and in response, to wirelessly receive other signaling that indicates the other wireless network slice for the other user application and to transfer the other signaling to the processing circuitry;
- the processing circuitry to execute the user application, and in response, to generate a request for the wireless network slice and exchange application data for the user application with the one or more radios;
- the one or more radios to wirelessly transfer the request for the wireless network slice and to wirelessly exchange the application data for the user application over the wireless network slice for the user application;
- the processing circuitry to execute the other user application, and in response, to generate another request for the other wireless network slice and to exchange other application data for the other user application with the one or more radios; and
- the one or more radios to wirelessly transfer the other request for the other wireless network slice and to wirelessly exchange the other application data for the other user application over the other wireless network slice for the other user application.

16. The wireless communication device of claim 15 wherein the user application comprises a machine control application and the wireless network slice comprises a machine control slice.

17. The wireless communication device of claim 15 wherein the user application comprises a media conferencing application and the wireless network slice comprises a media conferencing slice.

18. The wireless communication device of claim 15 wherein the user application comprises a social networking application and the wireless network slice comprises a social networking slice.

19. The wireless communication device of claim 15 wherein:
- the processing circuitry is to generate Radio Resource Control (RRC) reconfiguration messages to generate the request for the wireless network slice and to generate the other request for the other wireless network slice; and
- the one or more radios is to wirelessly transfer the RRC reconfiguration messages to wirelessly transfer the request for the wireless network slice and to wirelessly transfer the other request for the other wireless network slice.

20. The wireless communication device of claim 15 wherein the one or more radios is to wirelessly communicate with one or more Institute of Electrical and Electronic Engineers (IEEE) 802.11 (WIFI) access nodes to wirelessly download the user application and the other user application, to wirelessly receive the signaling and the other signaling, to wirelessly transfer the request and the other request, and to wirelessly exchange the application data and the other application data.

* * * * *